Nov. 30, 1943.                B. W. MANTLE                 2,335,350
                    MAGNETICALLY CONTROLLED VALVE
                    Filed July 3, 1941        3 Sheets-Sheet 1

INVENTOR.
BURR WARD MANTLE
BY Van Deventer & Grier
ATTORNEYS.

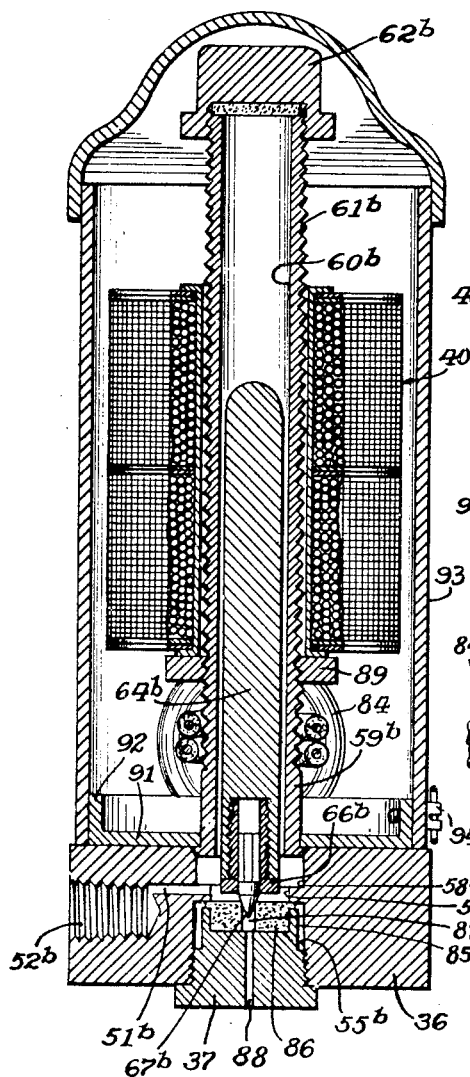
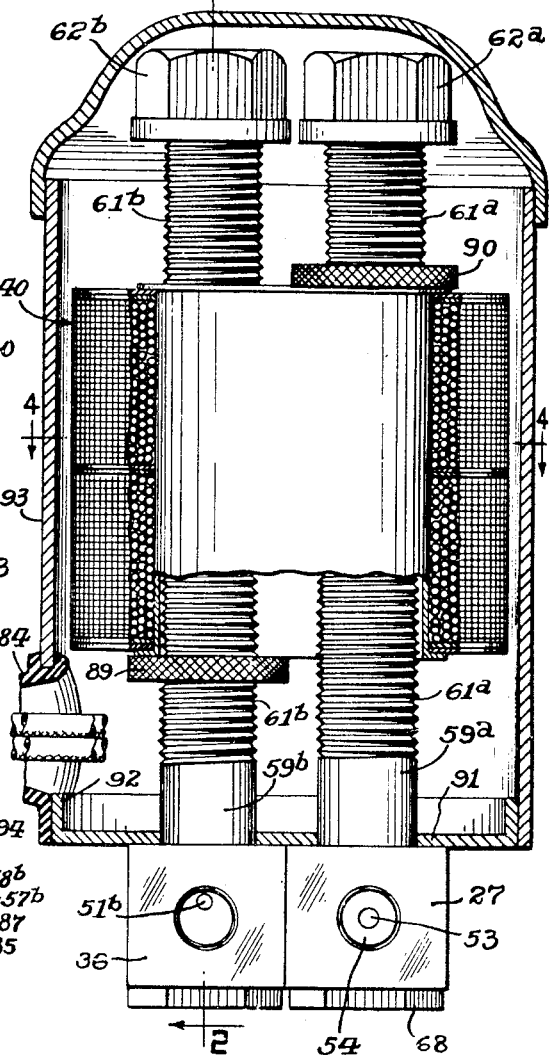

Nov. 30, 1943.  B. W. MANTLE  2,335,350
MAGNETICALLY CONTROLLED VALVE
Filed July 3, 1941     3 Sheets-Sheet 3
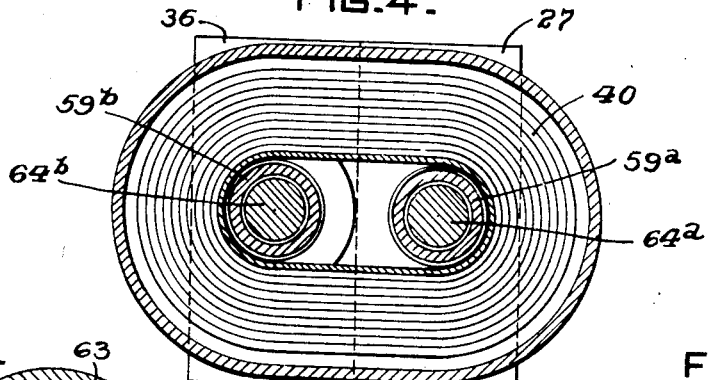
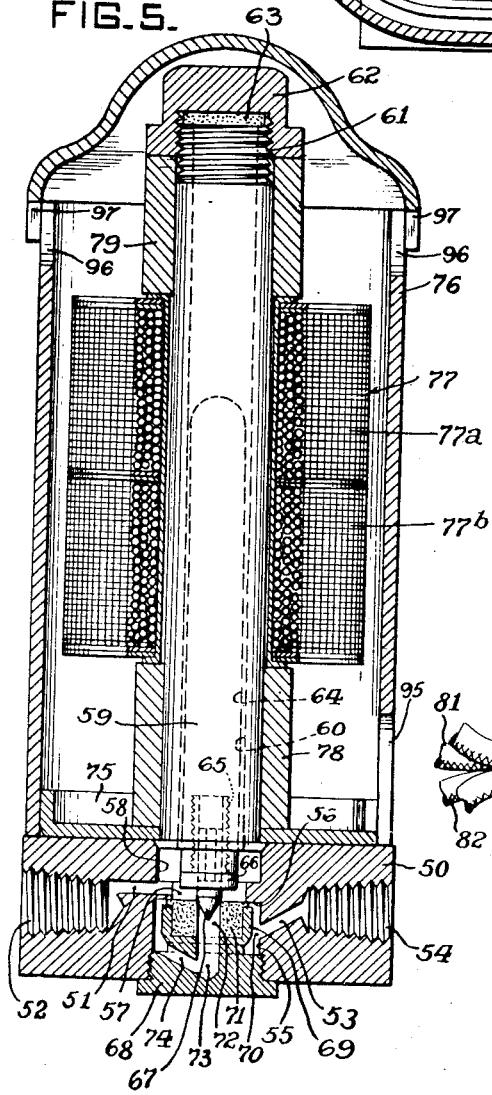
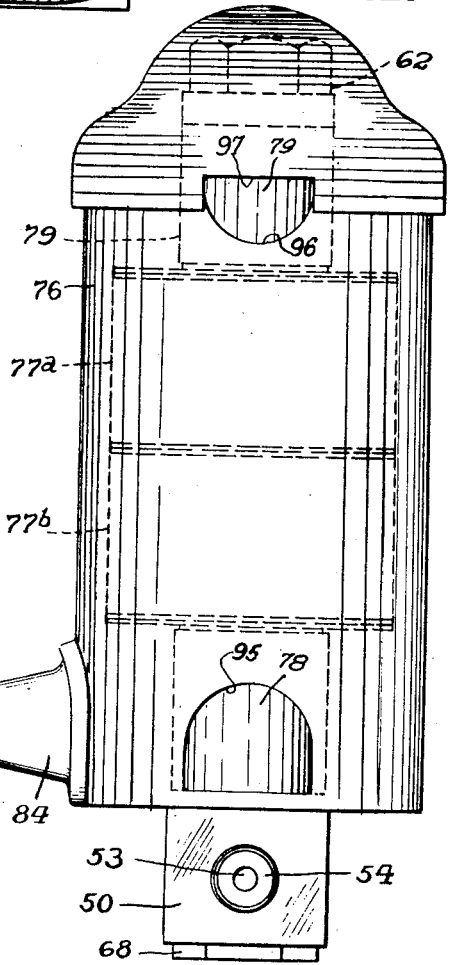
INVENTOR.
BURR WARD MANTLE
Van Deventer + Grice
ATTORNEYS.

Patented Nov. 30, 1943

2,335,350

UNITED STATES PATENT OFFICE 2,335,350

MAGNETICALLY CONTROLLED VALVE

Burr Ward Mantle, Pittsford, N. Y., assignor to American Brake Shoe Company, a corporation of Delaware Application July 3, 1941, Serial No. 400,913

2 Claims. (Cl. 175—341)

This invention relates to improvements in magnetically controlled valves, and has for an object the provision of a valve body having passages formed therein, a seat formed within said body between said passages, a valve member, a plunger above said valve body, a stem connecting said valve to said plunger, a cylinder extending upwardly from said body and embracing said plunger, and a solenoid winding embracing said cylinder.

Another object of the invention is the provision, in a magnetic valve, of a pair of valve bodies containing passages and seats therebetween, a valve member in each of said bodies, a plunger for each of said valve members, cylinders projecting upwardly from said bodies, and surrounding said plungers, and a solenoid winding embracing both said cylinders and common to both said plungers, whereby when said solenoid winding is energized said valves operate conjointly.

Other object and advantages of the invention will be obvious to those skilled in the art.

Referring to the drawings—

Figure 2 is a cross sectional elevation of a dual magnetic valve as seen along the lines 2—2 of Figure 3;

Figure 3 is a cross sectional elevation of the valve, Figure 2, taken at an angle of 90° to the section shown in Figure 2;

Figure 4 is a plan view, partly in section, as seen along the lines 4—4 of Figure 3;

Figure 5 is a sectional elevation of a single plunger solenoid valve; and

Figure 6 is an elevation of the valve shown in Figure 5 taken at an angle of 90° thereof.

Figure 1:
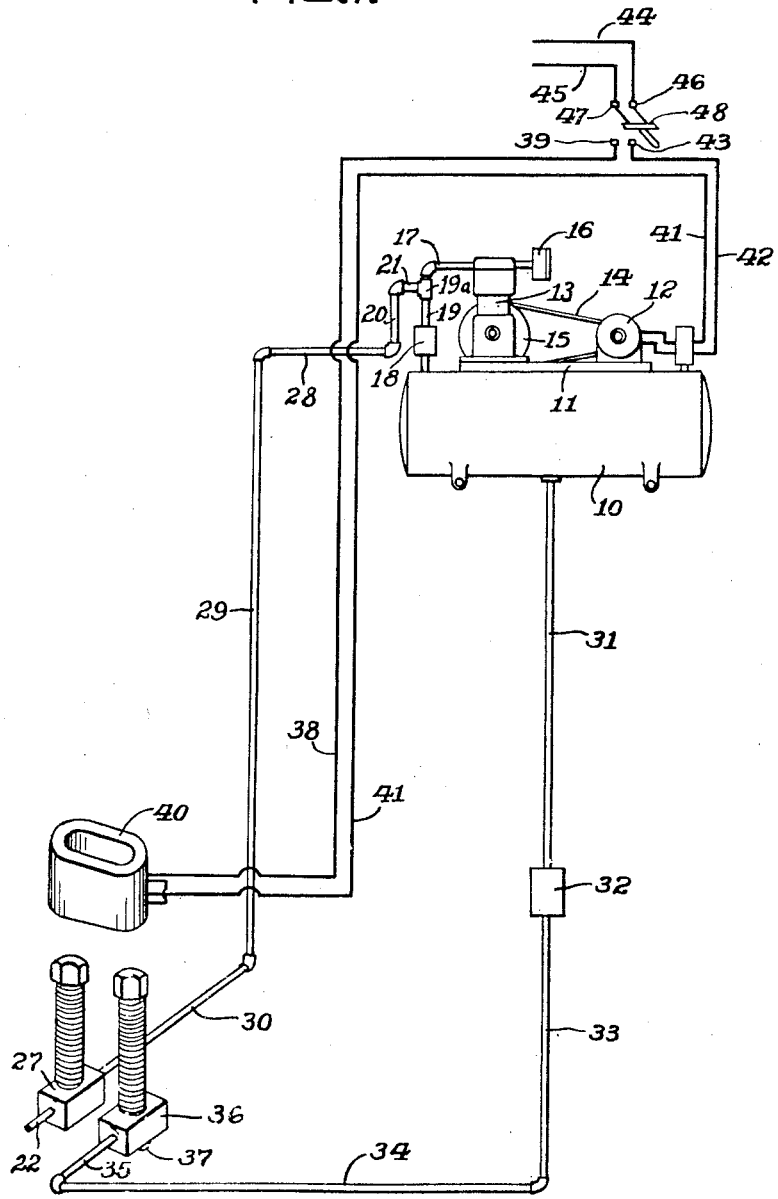
Figure 1 is a diagrammatic representation partially exploded showing the application of two-valve mechanisms controlled by a single solenoid winding for conjointly performing a plurality of operations.

In describing the invention, the single form of the valve, shown in Figures 5 and 6, will first be described; followed by a description of the dual form of the valve, shown in Figures 2, 3 and 4; and then a description of an application of the dual valve, as illustrated in Figure 1, will be given by way of example, as referred to above.

Referring to Figures 5 and 6, which illustrate the commercial form of the valve shown in Figure 1, Patent No. 2,256,565, wherein the solenoid winding is fixed with respect to the plunger, the valve body 50 is preferably formed of rectangular or square stock or material, and it has formed therein a passage 51 terminating in a female thread 52 adapted to accommodate a pipe or fitting. The body 50 may also have formed therein a passage 53 terminating in a female thread 54 to which a pipe or fitting may be connected.

A cross hole 55 is formed in the body 50 terminating on a shoulder 56. A hole 57 smaller in diameter than and concentric with the hole 55 is positioned in the wall forming the shoulder. Above the wall forming the shoulder is a hole 58 which is preferably of the same diameter as that of the hole 55.

Secured to the valve body 50 in fluid tight relation thereto is a tube 59 having a hole 60 extending therethrough, which is concentric with the holes 55, 57 and 58. The upper end of the tube 59 is provided with threads 61 which match internal threads formed in the sealing cap 62. Within the cap 62 is a sealing disc 63 which engages the upper end of the tube 59 in fluid tight relation.

Within the tube 59 is a plunger 64 having a threaded hole 65 formed in the lower end thereof. A bushing 66 threaded into the hole 65 carries on its lower end a conical point 67.

A bushing 68 is threaded into the hole 55 and has a portion 69 of reduced diameter, thereby forming between itself and the interior of the wall 55 an annular passage 70 communicating with the passage 53. The bushing 68 is counterbored and has positioned therein a second bushing 71 formed of a sealing medium and having a passage 72 formed therein, the upper end of which forms a seat for the conical valve 67. Within the bushing 68 is formed a hole 73 coinciding with the hole 72, and a cross hole 74 connects the passage 73 with the annular passage 70.

Mounted on the body 50 concentric with the tube 59 is a shallow cup-shaped member 75 which cooperates with a housing cap 76. A solenoid winding 77 is mounted on the tube 59, between the spacing blocks 78 and 79 which hold said winding in proper fixed relation to the path of travel of the plunger 64. The solenoid winding has lead wires 80, 81, 82 and 83 extending outwardly from the interior of the housing 76 through a suitable bushing or grommet 84.

The solenoid winding is made in two halves 77ª and 77ᵇ, so that these halves may be connected in series for use on 220 volt lines, for example, and connected in parallel or multiple for use on 110 volt lines. Assuming that the wires 80 and 81 extend from the half winding 77ª and that the wires 82 and 83 extend from the half winding 77ᵇ, wires 80 and 82 being the top ends of the windings and the windings being in the same direction, the wires 81 and 82 would be connected together, and the wires 80 and 83 would be connected to 220 volt service. On the other hand, for 110 volt services, the wires 80 and 82 would be connected together, and the wires 81 and 83 would be connected together, thereby connecting the half windings in parallel.

Referring now to Figures 2, 3 and 4, the valve body 27 (Figure 3) may be identical with the valve body 50 shown in Figure 5 and already described, and the tube 59ª is identical with the tube 59 in Figure 5 except that the threaded portion 61ª is extended further down from the top of the tube; the cap 62ª is identical with the cap 62.

The valve body 36 has one end thereof identical with the corresponding end in Figure 5. For example, the passage 51ᵇ, formed in the body 36, communicates with a female threaded hole 52ᵇ, and the holes 55ᵇ, 57ᵇ and 58ᵇ are identical with the holes 55, 57 and 58, respectively, shown in Figure 5. The bushing 37 is threaded into the hole 55ᵇ and has a portion 85 of reduced diameter which is counterbored and carries a bushing 86 of suitable material which carries a valve seat and forms a seal against the wall containing the hole 57ᵇ. The bushing 86 has a central hole 87 therethrough, the upper end of which forms a seat for the valve, to be presently described. A hole 88 formed in the bushing 37 is concentric with and forms an extension of the hole 87.

The tube 59ᵇ is identical with the tube 59ª, and the threads 61ᵇ extend downwardly to a point adjacent to the lower end of the tube. A plunger 64ᵇ is adapted to reciprocate within the bore 60ᵇ of the tube and is threadedly engaged by a bushing 66ᵇ which in turn carries a conical valve 67ᵇ. A nut 89 on the threaded tube 59ᵇ forms a stop for the lower end of the solenoid 40 which embraces both the tube 59ª and the tube 59ᵇ. A threaded nut 90 engages the thread 61ª on the tube 59ª and forms an upper stop for the solenoid winding 40.

By adjusting the nuts 89 and 90 up or down, the magnetic center of the solenoid may be set with respect to the centers of mass of the solenoid plungers 64ª and 64ᵇ. A shallow cup-shaped member 91 having an upturned flange 92 may preferably have holes formed therein through which the tubes 59ª and 59ᵇ pass and may abut the upper surfaces of the valve bodies 27 and 36. This member may be secured to said valve bodies in any suitable manner, and the flange 92 may be oblong or oval. A casing or housing 93 completely encloses the tubes, their sealing nuts 62ª, 62ᵇ, and the solenoid winding 40, and may be secured to the flange 92 in any suitable manner, for example, by means of screws, one of which is shown at 94. Wires forming the terminals for the solenoid windings may pass through the wall of the casing 93 in a manner similar to that shown in Figure 6.

When the solenoid 40 is energized, both the plunger 64ª and the plunger 64ᵇ are raised, thereby raising the conical valve 67 off of its seat and placing the passages 51 and 53 in communication with each other and raising the conical valve 67ᵇ off its seat and placing the passage 51ᵇ in communication with the outside air via the passages 87 and 88.

As an example of the use of dual valves controlled by a single solenoid winding, this application is shown in Figure 1 in connection with the motor compressor air supply system wherein one valve of said dual valve, when actuated, discharges the air in the pipe 17 between the exhaust valve of the compressor and the check valve 18 to the atmosphere via the pipes 21, 20, 28, 29, 30, and 22, thereby unloading the compressor. The other valve of the dual valve delivers air from the bottom of said tank to the atmosphere, thereby delivering condensed moisture from said tank to the atmosphere. The valves close after the compressor has attained its full running speed. Therefore my new and improved dual valve may effect the unloading of the compressor, and the removal of condensed vapor from the bottom of the tank, thus performing the function of the valve shown in Figure 1 in the aforesaid patent, and additionally performing a portion of the function of the valve shown in Figure 4 of said patent. Thus it will be understood that this is merely one example of the use of the new and improved dual valve.

The control of the dual valve is effected by means of a single solenoid winding which is connected in series with the motor and is so proportioned that when the motor is drawing starting current, the magnetic flux generated in the solenoid is sufficient to raise both of the plungers and as soon as the starting of the motor cuts out and it is drawing its normal running current, the magnetic flux of the solenoid is substantially reduced and the plungers fall and return the valves to their normal positions.

Referring to Figure 1, an air tank 10 has mounted thereon a base 11 carrying an electric motor 12 and an air compressor 13, a belt 14 being provided for transmitting power from the motor to the compressor fly wheel 15. The inlet of the compressor may be provided with a strainer and silencer 16. The discharge of the compressor is led via the pipe 17, a pipe 19 and a check valve 18 to the tank.

A T 19ª has a nipple 21 connected thereto and it, in turn is connected to a series of pipes 28, 29 and 30. The pipe 30 is connected to the valve body 27. A pipe 22 may lead from the valve body 27 to the atmosphere.

One end of a pipe 31 is connected to a sump or low point in the tank 10 in order to lead condensed moisture therefrom. The other end of the pipe 31 is connected to a strainer 32. In turn, pipes 33, 34 and 35 lead to the valve body 36.

When the solenoid plunger of the valve 27 is actuated the valve therein is unseated and air under pressure may pass therethrough from pipes 17, 19 (between the discharge valve of the compressor and the check valve 18) to the pipe 22, thereby unloading the compressor.

When the solenoid plunger of the valve 36 is actuated the valve therein is unseated, thereby permitting condensed moisture to pass from said low point via pipes 31, 33, 34, 35, the valve in 36 and the discharge opening 37 to the atmosphere.

A solenoid winding 40 for actuating the plungers in both valves, has one lead 38 connected to the switch point 39, and the other end of the solenoid winding is connected via a wire 41 to one terminal of the motor 12. The other terminal of the motor 12 is connected via the wire 42 to the switch point 43. Wires 44 and 45 from a source of current are respectively connected to the switch points 46 and 47 so that when the switch 48 is closed, the motor draws starting current, thereby energizing the solenoid 40 sufficiently to raise the plungers in both the valve 27 and the valve 36. Since the valve 27 unloads the compressor, and since the valve 36 permits the discharge of moisture from the tank, these two functions are effected simultaneously each time the motor 12 starts up.

The solenoid winding 40 is so proportioned that when the motor gains speed and ceases to draw starting current, the running current does not generate sufficient flux to continue to hold the plungers up. Therefore they drop down, and the valves thereon are re-seated. When the valves re-seat, the air is no longer delivered to the atmosphere via the valve 27, and condensed moisture is prevented from discharging from the tank 10 to the atmosphere with the result that the system operates normally.

In cases where it is desired to operate the valves with a time element therebetween, especially in cases where the amount of current passing through the solenoid winding is gradually increased, the center of mass of one of the solenoid plungers may be at a higher level than the center of mass of the other plunger with respect to the magnetic center of the winding. The simplest way to do this is to have one of the plungers shorter than the other, in which case the shorter plunger will have its center of mass lower than the center of mass of the longer one.

In connection with the above descriptions of the two forms of the invention, I have not disclosed the use of springs associated with the solenoid plungers, as it is more convenient to use the force of gravity for urging the plungers downwardly. However, I do show means (gravity) for causing said plungers to re-seat the valves, and in the aforesaid application Serial Number 297,215, I have shown the use of springs in connection with the plungers and believe that their use would be important in connection with valves handling high pressures. I therefore do not wish to be limited to the specific showing in the present application and wish it to be understood that the forms herein described and illustrated are given merely by way of example and to show preferred forms of construction.

I have found that by ventilating the casing enclosing the solenoid windings, the life of the winding is increased and the overall performance of the valve is improved. One method of effecting ventilation is shown in Figures 5 and 6, wherein a comparatively large opening 95 is formed in the lower wall of the casing 76, and a plurality of openings 96 are formed at the upper end of the casing, matching notches 97 also being formed in the cap which is secured to the upper end of the casing.

It is obvious that the valve or valves may control in the same manner in using polyphase current instead of single phase. It is also obvious that the tube embracing the plunger need not extend vertically from the valve body, as the device will operate with the tube in other positions than vertically upward. I also contemplate making the multiple valve with a single valve body with a plurality of passages and a plurality of seats and valves therefor, each valve having its own individual plunger, and all plungers controlled by one solenoid; in fact, many changes may be made in the arrangements herein shown and described without departing from the spirit of the invention as set forth in the following claims.

What is claimed is:

1. In a solenoid, supporting means, a pair of spaced tubular members carried on said supporting means and having their external surfaces threaded, said members being substantially parallel to each other, cap nuts closing and sealing the ends of said tubular members, an oval solenoid winding carried on and embracing said tubular members, a threaded nut on at least one of said members and engaging one end of the solenoid winding, a second threaded nut on at least one of said tubular members and engaging the other end of said winding for holding said winding in definite space relation to said supporting means, a shallow cup-shaped member on said supporting means, a solenoid plunger reciprocably carried in the hollow interior of one of said tubular members, a second solenoid plunger reciprocably carried in the hollow interior of the other of said tubular members, operating elements connected to and moved by said plungers, said operating elements being adapted to normally hold said plungers with their centers of mass in definite relation to the magnetic center of said solenoid, a casing enclosing said solenoid winding and said tubular members and engaging said cup-shaped member, and means for securing said casing to said cup.

2. The invention according to claim 1, in which one of said solenoid plungers is shorter than the other and the operating ends of said plungers are equal distances from the center of the coil, the center of mass of said shorter plunger is lower with respect to the magnetic center of the solenoid winding than the center of mass of the other of said plungers.

BURR W. MANTLE.